United States Patent Office 3,475,258
Patented Oct. 28, 1969

3,475,258
REMOVAL OF ADHERING DEPOSITS FROM EXTERNALLY COOLED CONDUITS
Henry W. Rahn, Pittsburgh, Pa., and Kenneth W. Richardson, Barberton, Ohio, assignors to PPG Industries Inc., Pittsburgh, Pa., a corporation of Pennsylvania
No Drawing. Filed Dec. 28, 1966, Ser. No. 605,216
Int. Cl. F28f 19/00; F28g 13/00
U.S. Cl. 165—1                        25 Claims

ABSTRACT OF THE DISCLOSURE

Solid, inorganic water-soluble salts are introduced in effective amounts into an externally cooled conduit, e.g., heat exchanger, used to cool gaseous suspensions of particulate solids, e.g., pigmentary metal oxides such as $TiO_2$, to effect inhibition and/or removal of solids adhering to the internal surface of the conduit.

---

This invention relates to the production of metal oxides and, in particular, pertains to an improvement in processes for producing pigmentary metal oxide by vapor phase reaction, e.g., oxidation and hydrolysis, of metal halides. This invention especially pertains to the step of cooling or quenching highly-heated reaction products from such vapor phase reactions and, more particularly, relates to improving the heat transfer efficiency of externally cooled conduits utilized to indirectly cool said highly-heated reaction products. Still more particularly, this invention relates to the removal and/or inhibition of deposits of particulate solids such as metal oxide deposits, e.g., scale or growth, from the internal surfaces of indirect heat exchange apparatus. The present invention is especially applicable to the production of pigmentary titanium dioxide by vapor phase oxidation of titanium tetrahalide.

More specifically, this invention comprises admixing an effective amount of a solid, inorganic water soluble salt with a highly-heated gaseous suspension containing particulate metal oxide prior to or during which such gaseous suspension is subjected to indirect heat exchange. Such gaseous suspensions are typically reactor product streams obtained from vapor phase reaction of metal halides at temperatures above 500° C. In one embodiment, the solid, inorganic water-soluble salt is a solid metal halide selected from the group consisting of alkali metal and alkaline earth metal halides. In another embodiment, the solid, inorganic water-soluble salt is an alkali metal or alkaline earth metal carbonate or bicarbonate. In a particular embodiment, solid inorganic water-soluble salts are combined with a hot gaseous suspension of finely-divided titanium oxide prior to its introduction, into an elongated, relatively restricted, conduit for passage in indirect heat exchange with a cooling medium flowing about the exterior surface of said conduit.

In the manufacture of particulate metal oxide by vapor phase reaction of metal halide, vaporous metal halide and oxygen or an oxygen-containing gas or steam are fed to a suitable reaction vessel and reacted at elevated temperatures to yield a finely-divided product. The particular reaction conditions and processing steps, i.e., temperatures, pressures, reactant ratios; the manner in which the reactants are fed to the reaction vessel, e.g., whether preheated to below or above reaction temperatures, whether reactants are admixed with each other or other materials such as nucleating agents, inert gases, combustion gases, and the direction of reactant introduction, is not necessary to an understanding of, nor do they represent a part of, the present invention. These particular aspects of vapor phase oxidation processes are well known in the art.

Since vapor phase reaction of metal halides yield highly-heated gaseous suspensions of the corresponding metal oxide, the discussion of the preparation of such suspension can be limited to a typical vapor phase reaction. Typical of metal halide vapor phase reaction processes is the vapor phase oxidation of titanium tetrahalide.

In the vapor phase oxidation of titanium tetrahalide, vaporous titanium tetrahalide, e.g., titanium tetrachloride, titanium tetrabromide, and/or titanium tetraiodide, and at least a stoichiometric amount of oxygen or oxygenating gas are fed to a reaction zone. The reaction zone is typically held at temperatures above 500° C., and usually is maintained at temperatures from 800° C. to 1600° C. The oxygen and the titanium tetrahalide react within the reaction zone to yield gaseous halogen and solid, finely-divided particles of titanium oxide. The products of the oxidation reaction emerge from the reactor as a highly-heated gaseous suspension of titanium oxide, e.g., at temperatures in excess of 1000° C., often ranging from 1200 to 1800° C. In such a process, the gaseous suspension typically comprises a suspension of the oxide in liberated or added halogen gas and other residual gases, depending on the reactants and other materials introduced to the reactor. For example, the oxidation product stream also can contain an excess of oxygen, nitrogen, if air is used as the oxidizing gas, and if auxiliary chemical reactions occur within the furnace, there will be products of combustion that will depend upon the fuel used. Typical fuels are carbon, carbon monoxide, hydrocarbons, and hydrogen, and, therefore, the products of combustion are usually carbon monoxide, carbon dioxide, and water vapor. Due to the high temperature and corrosive nature of the product gases, the products of oxidation cannot be handled satisfactorily in conventional equipment used for the separation of the titanium dioxide from the product gases. Consequently, it has been found necessary to cool the gaseous titanium dioxide suspension before the separation of the oxide from product gases.

In producing pigmentary, finely-divided metal oxide, e.g., titanium dioxide, by such vapor phase oxidation reaction, it is necessary that the product gaseous suspension be cooled to below reactive temperatures so that undesirable particle size growth is prevented. Consequently, rapid quenching of the reaction products to a relatively inactive temperature range is a prime requisite when the metal oxide is desired in a finely-divided state.

Quenching or rapid cooling of hot metal oxide suspensions, e.g., hot titanium dioxide gaseous suspensions, is achieved commercially by several means with varying degrees of success. One method of cooling consists of passing the hot, gaseous suspension through an indirect heat exchange apparatus which is, in effect, one conduit or a series of long conduits or pipes that have relatively cool walls in comparison to the gaseous suspension. The difference in wall temperature is typically provided by passing cool fluid externally over the walls of the conduit, i.e., the heat exchange surface.

It has been found that as hot metal oxide particles, and especially titanium dioxide particles, come in contact with a relatively cooler heat exchange surface, such particles are cooled and deposited on the cooler surfaces. It has also been found that the cooled particles tend to adhere to the internal surfaces of the heat exchange apparatus. One suggested cause for this adhesion is that above 400–600° C., titanium dioxide takes on the characteristic of a plastic, sticky particle. Other suggested causes for titanium dioxide deposits within indirect heat exchange apparatus are the presence of electrostatic forces and thermal gradients in the apparatus. Such deposits may, and often do, become objectionally thick and can result in plugging of the heat exchange apparatus. Such a condition would cause shutdown of the plant and represents a hazardous condition. Moreover, because the metal oxide deposit is a poor heat conductor, the internal surfaces of the heat exchange apparatus become quickly insulated. This factor inhibits their heat transfer function and thus renders the over-all efficiency of the heat exchange apparatus poor.

It has been suggested that the above-described metal oxide scale, e.g., titanium dioxide scale, can be removed by incorporating into the product stream a scouring amount of a cooler, finely-divided attritive inert solid such as sand, alumina, mullite, or metal oxide of the same composition. See, for example, U.S. Patent 2,721,-626. In the case of pigmentary metal oxide, the use of sand, quartz, alumina, other foreign inert solid materials, or non-pigmentary size metal oxide results in the incorporation into the process of manufacture of an additional separation step in order to remove the inert solid foreign material or non-pigmentary metal oxide from the product stream. Moreover, in the case of pigmentary titanium dioxide, the requirements of the pigment industry are such that the tolerance of foreign substances, such as grit, e.g., sand, non-pigmentary $TiO_2$, in pigmentary $TiO_2$ are very low. Thus, it becomes very difficult to eliminate such substance from the pigmentary $TiO_2$ once they are added. This becomes even clearer when it is further understod that the particle size of pigmentary $TiO_2$ is about 0.20–0.35 micron, usually about 0.20 to 0.25 micron.

It has now been discovered that solid, inorganic water-soluble salts can be utilized to remove metal oxide deposits, notably pigmentary titanium dioxide scale or growth, from the internal surfaces of indirect heat exchange apparatus. Moreover, since such solid inorganic salts are soluble in water, they are easily and conjointly removed from the product stream with other water-soluble impurities, e.g., sodium sulfate, sodium halide, e.g., sodium chloride, ammonium chloride, sodium hydroxide, and ammonium hydroxide, during conventional subsequent aqueous treatment of the metal oxide particles. Thus, the practice of the present invention obviates the requirement of an additional separation step imposed by the use of inert and non-pigmentary metal oxide particles. Moreover, the present invention provides a novel and facile method for removing metal oxide scale or incrustation from the internal surfaces of heat exchangers and thus permits the maintenance of the heat transfer efficiency of such heat exchangers at a high level.

In accordance with the present invention, an effective amount of a solid, inorganic water-soluble salt is introduced into a hot gaseous suspension of metal oxide particles before or during which such suspension is cooled to non-reactive temperatures. Non-reactive temperatures can be defined as that temperature below which no substantial reaction between any of the components of the gaseous suspension takes place. The solid, inorganic water-soluble salts are added in amounts sufficient to effect removal of the oxide scale or growth and/or for improving the heat transfer efficiency of the heat exchange apparatus. Typically, it has been found that only a small amount of such salts is needed to improve or maintain heat transfer efficiency at substantially startup conditions.

The heat transfer efficiency of indirect heat exchange apparatus is readily gaged by observing the difference between the inlet and outlet temperatures of the fluid employed to cool the heat exchange surface or by observing the outlet gas temperature of the cooled gaseous suspension. Thus, when incrustation develops and the amount of heat transfer through the walls of the heat exchanger drops, the difference between the inlet and outlet temperatures of the cooling fluid also falls. Moreover, the outlet temperature of the gaseous suspension rises. However, after addition of solid, inorganic water-soluble salts in accordance with the process of the present invention, the temperature difference between the inlet and outlet cooling fluid increases substantially, thereby demonstrating the removal of scale followed by a consequent improvement in heat transfer rate. Moreover, the outlet temperature of the cooled gaseous suspension falls.

The amount of inorganic, water-soluble salt employed in the process of the present invention is relatively small and, therefore, such salt does not appreciably aid in the direct cooling of the product stream. The principal effects of the incorporation of the water-soluble salt in the gaseous suspension appear to be the removal of metal oxide scale or growth built up within the heat exchanger and the consequent improvement or maintenance of the heat transfer rate. The mechanism by which the inorganic salt removes oxide scale is not known at present. However, since only relatively small amounts are necessary, as distinguished from the comparatively large amounts of attritive inert solids required in the processes described in the prior art, it is not believed that the present discovery is explainable on the basis of a scouring or abrasive action by the inorganic water-soluble salt.

In general, the amount of solid, inorganic water-soluble salt employed to remove metal oxide scale and improve the heat transfer efficiency of indirect heat exchangers can vary broadly. Only that amount which effects the desired result, i.e., an effective amount, need be employed. Typically, anywhere from about 0.01 to about 5 weight percent, advantageously from about 0.1 to 2.0 weight percent, of such salt, based on the amount of metal oxide produced, can be used. Use of an excess of inorganic salt is not economical and, while amounts in excess of 5 weight percent, e.g., up to about 20 weight percent or higher are contemplated within the purview of the present invention, it has been found that amounts in the range of about 0.1–2 weight percent are adequate.

The size and form of the solid inorganic water-soluble salt employed can also vary. Generally, any granular or powdery form is applicable and such material can, for example, vary from ¼ inch to 200 mesh Tyler standard screen. Mixtures of sizes, such as obtained in screening with Tyler screens, are also suitable.

The inorganic salts of the present invnetion can be added continuously, intermittently, or as needed, to a vapor phase oxidation product stream. They can be added at any convenient point in the cooling portion of the system, but are added most conveniently to the product stream as it discharges from the reactor or at any suitable point thereafter. The solid salts can be added at a multiple of addition points and are advantageously added at those points near where a relatively severe buildup may occur, due to the configuration of the cooling apparatus, such as at return or other forms of bends.

Inorganic salts contemplated for use in the present invention include any inorganic metal salt which is water soluble and solid or which yields water-soluble compounds at the temperatures to which such salts are subjected. Melting points of the former group of salts are advantageously above the maximum gas temperature to which they are subjected to avoid operating difficulties. Of particular utility are the halides, sulfates, bisulfates, nitrates, carbonates, bicarbonates, chlorates, phosphates, and silicates, of alkali metals and alkaline earth metals, or mixtures thereof. Also contemplated are such salts of aluminum and zirconium.

The temperatures to which the inorganic salts of the instant invention are subjected range from the reactor exit temperature of the gaseous suspension to room temperature. Thus, temperatures in excess of 1000° C. down to about 20° C. are contemplated. Generally, temperatures of from about 850° C. to 25° C. are encountered. Variations in the reactor exit temperature will dictate the selection of the particular inorganic salt used.

In one embodiment of the present invention, the inorganic salt is unchanged chemically, i.e., it is chemically inert or stable to the environment in which it is placed. Thus, for example, where potassium chloride is employed as the inorganic salt, it passes through the heat exchange system unchanged chemically and is then removed from the metal oxide during subsequent aqueous treatment of the metal oxide, i.e., it goes into solution. In another embodiment, the inorganic salt is not inert or stable under the physical conditions of the heat exchange environment and breaks down into its component parts to yield, for example, gaseous components, which do not contaminate the metal oxide, water-soluble compounds, or compounds which form water-soluble compounds. Exemplary of this latter embodiment is sodium hydrogen carbonate ($NaHCO_3$) or sodium carbonate ($Na_2CO_3$) which can give up carbon dioxide and, in the chlorine atmosphere of the titanium dioxide gaseous suspension, form sodium chloride.

The solid inorganic salts of the present invention or the compounds formed as a result of their use in the manner described in the present process should be sufficiently water-soluble to be removed by simple washing techniques. Typically, such salts should be sufficiently soluble so that at least about 0.04 pound of the salt are dissolved in a gallon of water at 20–25° C. Expressed differently, the salt should be soluble to the extent of about 0.004 gram/ml. of water. Salts which are soluble in the amount of 0.01 gram/ml. of water or greater are most useful in the present process.

Of utility in the process of the present invention are the metal halides of alkali metals, alkaline earth metals, aluminum, zirconium, and mixtures thereof. Typical of such compounds are the fluorides, chlorides, bromides, and iodides, respectively, of sodium, potassium, lithium, rubidium, cesium, magnesium, calcium, barium, beryllium, strontium, zinc, rhodium, aluminum, and zirconium. Economically preferred are the halides, especially the chlorides, of sodium, potassium, and calcium.

Typical of the sulfates, bisulfates, nitrates, carbonates, bicarbonates, chlorates, phosphates, and silicates, of the alkali metal, alkaline earth metal, aluminum and zirconium, useful in the process of the present invention include: sodium sulfate, sodium nitrate, sodium carbonate, sodium hydrogen carbonate, sodium pyrophosphate, sodium metaphosphate, sodium meta-, ortho-, and di-silicate, potassium carbonate, potassium hydrogen carbonate, potassium sulfate, potassium hydrogen sulfate, potassium orthophosphate, potassium metaphosphate, potassium meta-, tetra-, and di-silicate, calcium sulfate, calcium nitrate, calicum carbonate, calcium meta-, and orthosilicate, magnesium carbonate, magnesium sulfate, magnesium nitrate, zinc carbonate, aluminum sulfate, and aluminum silicate ($Al_6Si_2O_{13}$).

The process of the present invention is applicable to a process employing indirect heat exchange apparatus for cooling highly-heated, finely-divided metal oxides, especially tacky metal oxides. Notably, the present process is applicable to the vapor phase reaction, i.e., oxidation, of metal halides, such as titanium, aluminum, zirconium, silicon, tin, zinc, antimony, chromium, cobalt, beryllium, boron, nickel, vanadium, etc., and especially to white oxide forming metals. White oxide forming metals can be ascertained by referring to the Handbook of Chemistry and Physics, 37th edition (1955), published by Chemical Rubber Publishing Company. This hand book contains a listing of the oxides of the elements, together with their physical properties. The present invention is especially applicable ot the vapor phase oxidation of titanium tetrahalides, notably, titanium tetrachloride, titanium tetrabromide, and titanium tetraiodide.

The present process is more particularly described in the following examples which are intended as illustrative only since numerous modifications and variations therein will be apparent to those skilled in the art.

EXAMPLE I

A suitable, refractory-lined, cylindrical reaction vessel was employed in this and subsequently described examples for carrying out vapor phase oxidation of titanium tetrachloride. Oxidation products comprising a suspension of titanium dioxide in a gaseous stream comprising substantially chlorine and unreacted oxygen were removed from the reactor through a suitable outlet attached to a transfer line consisting of approximately 35 feet of 4-inch diameter jacketed nickel pipe. The transfer line, which was water cooled, was attached to an indirect heat exchanger comprising, in essence, a long conduit that was externally cooled by spraying water over the external surfaces of the conduit. Suitable inlet means was provided at the transfer line inlet for the introduction of solid, inorganic, water-soluble salt.

The indirect heat exchanger was composed of essentially two sections, a primary and a secondary section. The primary section was fabricated from about 11 runs of 16-foot length 6-inch diameter nickel pipe. The secondary section was fabricated from about 10 runs of 20-foot length 6-inch diameter aluminum pipe and about 4 runs of 20-foot length 5-inch diameter aluminum pipe. A "run" of pipe is a straight piece of unbroken pipe of a recited length and diameter. Runs of pipe were connected to each other by 180° bends. Manometers were installed at the beginning and end of the transfer line. Thermocouples were also placed at the inlet and outlet points of both sections of the heat exchanger and at the inlet to the transfer line.

The reaction vessel was equipped with suitable feed tubes through which were fed 42.2 gram moles per minute of oxygen, 35.8 gram moles per minute of vaporous titanium tetrachloride, and 21.9 gram moles per minute of chlorine gas. A gaseous suspension of titanium dioxide having a temperature of about 1500° F. was removed from the reaction vessel and mixed with about 475 gram moles per minute of relatively cool recycle gas. This gas (recycle) was essentially the gaseous product stream from which solid titanium dioxide has been removed, and was composed substantially of chlorine gas. The purpose of the recycle gas was to partially quench the reaction products and to aid in communicating the product gaseous stream through the heat exchanger.

The above-described equipment was operated at the conditions specified until substantially steady state conditions were achieved. At that time, the following parameters were measured: pressure inlet to the transfer line; pressure inlet to the primary section of the heat exchanger; inlet and outlet temperatures for the primary section of the heat exchanger; and inlet and outlet temperatures for the secondary section of the heat exchanger. A half hour after the initial measurements, potassium chloride (kalium standard grade), having a mesh size distribution of from about 14 to 65, and in an amount of about 60 grams per minute were continuously added at approximately the beginning of the transfer line. A total of about 4.2 pounds of potassium chloride was added during a half hour which amount to about 2 weight percent, based on the amount of titanium dioxide being produced. Following completion of the addition of potassium chloride, a second series of readings were taken. Both the first and second series of readings are tabulated in Table I.

TABLE I

| Time | Pressure-Inlet to Transfer Line, in. Hg | Pressure-Inlet to Primary Heat Exchanger, in. Hg | Temperatures, ° F. in Heat Exchanger | | | |
|---|---|---|---|---|---|---|
| | | | Primary Section | | Secondary Section | |
| | | | Inlet | Outlet | Inlet | Outlet |
| 1400 | 12.1 | 11.3 | 500 | 320 | 270 | 100 |
| 1430 | | Potassium chloride added | | | | |
| 1500 | 11.1 | 10.9 | 270 | 150 | 110 | 80 |

The data in Table I show that the pressure difference between the inlet and outlet points of the transfer line decreased. This change in pressure drop is indicative of oxide removal taking place in the transfer line. Furthermore, after starting potassium chloride introduction, the inlet temperature to the secondary section of the heat exchanger dropped to 110° F., which was nearly equal to the outlet temperature of the secondary heat exchanger prevailing before potassium chloride addition, i.e., 100° F. Thus, the addition of potassium chloride permits utilization of about 50 percent of the total heat exchange surface employed when potassium chloride is not used.

While only the readings at the end of potassium chloride addition are listed in Tablie I, it should be noted here that the benefits of such addition, e.g., change in pressure drop and lower temperatures, were observed in a very few minutes after KCl addition was begun.

EXAMPLE II

The equipment of Example I was operated under the same feed conditions until the outlet temperature of the secondary heat exchanger rose above 200° F. At that point, a 360 gram portion of potassium chloride (kalium standard grade) was added at the same point described in Example I over a period of several minutes. Additional 360 gram portions were added, as needed, in order to maintain the exit temperature of the secondary section of the heat exchanger below 200° F. Temperatures were recorded before and after potassium chloride addition at the following points: transfer line inlet, inlet to the primary heat exchanger, and outlet of the secondary heat exchanger. A portion of the data obtained are tabuled in Table II.

TABLE II

| Time | Transfer Line Inlet, ° F. | Temperatures, ° F. in Heat Exchanger | |
|---|---|---|---|
| | | Primary Section Inlet | Secondary Section Outlet |
| 0300 | 1,490 | 680 | 230 |
| 0305 | Added 360 grams KCl to transfer line inlet | | |
| 0400 | 1,490 | 550 | 90 |
| 0500 | 1,470 | 620 | 120 |
| 0600 | 1,470 | 640 | 170 |

The data in Table II show that ten minutes after the addition of potassium chloride to the beginning of the transfer line, the temperature at the outlet of the secondary heat exchanger dropped from 230° F. to 90° F. The data also show that even two hours later, the temperature was still below 200° F. At the time of introduction, the amount of potassium chloride added was equal to about 0.2 weight percent based on the amount of titanium dioxide being produced.

EXAMPLE III

In accordance with the procedures of Example I, potassium chloride having a mesh size distribution of from about 20 to 200 was continuously added at a rate of 0.2 pound per hour. Such addition lowered the pressure drop in the transfer line from 2.2 inches of mercury to 1.5 inches of mercury.

EXAMPLE IV

Example I is repeated except that sodium chloride, calcium chloride, potassium bromide, sodium bromide, lithium bromide, magnesium chloride, calcium chloirde and barium chloride are each, in turn, substituted for potassium chloride. Similar results, as detected in Example I, in pressure drop and lower operating temperatures in the heat exchanger are observed.

EXAMPLE V

Example I is repeated except that sodium carbonate, sodium hydrogen carbonate, potassium carbonate, sodium sulfate, calcium nitrate, and magnesium sulfate are each, in turn, substituted for potassium chloride. Improved heat transfer efficiency in the heat exchange section, as well as lower operating temperatures, is observed a short time after the introduction of such salts.

The present invention, as particularly set forth in the foregoing description and examples, has utility in processes which cool or quench heated gaseous suspensions of particulate solids with externally cooled conduits. It has particular utility when the particulate solids tend to deposit on, and adhere to, the walls or internal surface of the conduit such as experienced in cooling finely-divided metal oxide, e.g., titanium dioxide. Such deposits, as described hereinabove, build up and restrict or hinder the passage of the gaseous suspension through the conduit and hinder the removal of heat from the suspension because of its poor heat conductivity, i.e., it acts as an insulator. The use of solid, inorganic water-soluble salts, however, inhibits the deposit and growth of such solids on the internal walls of the externally cooled conduit, i.e., limits the thickness of the deposit, aids in the removal of deposits, once formed, and thereby improves the passage of the gaseous suspension through the conduit and enhances the removal of heat from the gaseous suspension by improving the heat transfer efficiency of the system.

While there are above described a number of specific embodiments of the present invention, it is obviously possible to produce other embodiments and various equivalent modifications thereof without departing from the spirit of the invention.

Having set forth the general nature and specific embodiments of the present invention, the true scope is now particularly pointed out in the appended claims.

What is claimed is:

1. A method for inhibiting the growth of particulate solid deposits within externally cooled conduits during cooling of gaseous suspensions of said particulate solid, which comprises introducing an inhibiting amount of solid, inorganic water-soluble metal salt into said conduit.

2. A method according to claim 1 wherein said particulate solid deposits are deposits of finely-divided metal oxide.

3. A method according to claim 1 wherein said particulate solid deposits are deposits of pigmentary titanium dioxide.

4. A method according to claim 1 wherein said solid, inorganic water-soluble metal salt is selected from the group consisting of halides, sulfates, bisulfates, nitrates, carbonates, bicarbonates, chlorates, phosphates, and silicates of metals selected from the group consisting of alkali metals, alkaline earth metals, aluminum and zirconium.

5. A method according to claim 1 wherein between about 0.01 and about 20 weight percent of solid, inorganic water-soluble metal salt, based on the amount of particulate solids being cooled, is used.

6. A method for removing finely-divided metal oxide deposits from within externally cooled conduits utilized for the removal of heat from gaseous suspensions of said metal oxide, which comprises introducing an effective amount of solid, inorganic water-soluble metal salt into said conduit.

7. A method according ot claim 6 wherein said finely-divided metal oxide is titanium dioxide and wherein between about 0.01 and about 20 weight percent of solid, inorganic water-soluble metal salt selected from the group consisting of halides, sulfates, bisulfates, nitrates, carbonates, bicarbonates, chlorates, phosphates, and silicates of metals selected from the group consisting of alkali metals, alkaline earth metals, aluminum and zirconium is introduced into said conduit.

8. A method according to claim 7 wherein said solid, inorganic water-soluble metal salt is potassium chloride or sodium carbonate.

9. A process for improving the heat transfer efficiency of externally cooled conduits used to cool gaseous suspensions of finely-divided metal oxide that tend to deposit on and adhere to the internal surface of said conduit, which comprises introducing to said conduit an effective amount of a solid, inorganic water-soluble metal salt selected from the group consisting of halides, sulfates, bisulfates, nitrates, carbonates, bicarbonates, chlorates, phosphates, and silicates of metals selected from the group consisting of alkali metals, alkaline earth metals, aluminum and zirconium.

10. A process for maintaining the heat transfer efficiency of externally cooled conduits used to cool gaseous suspensions of particulate solids that tend to deposit on and adhere to the internal surface of said conduit, which comprises introducing to said conduit an effective amount of a solid, inorganic water-soluble metal salt selected from the group consisting of halides, sulfates, bisulfates, nitrates, carbonates, bicarbonates, chlorates, phosphates, and silicates of metals selected from the group consisting of alkali metals, alkaline earth metals, aluminum and zirconium.

11. A process according to claim 10 wherein said particulate solid is a finely-divided metal oxide.

12. A process according to claim 11 wherein from 0.01 to 20 weight percent of solid, inorganic water-soluble metal salt, based on the amount of particulate solids cooled, is used.

13. A process according to claim 10 wherein said particulate solid is pigmentary titanium dioxide and wherein between about 0.01 and about 20 weight percent of said solid, inorganic water-soluble metal salt is introduced to said conduit.

14. In a process of preparing pigmentary titanium dioxide by vapor phase oxidation of titanium tetrahalide with an oxygenating gas at elevated temperatures wherein a gaseous suspension of titanium dioxide is cooled in an externally cooled conduit, the improvement which comprises introducing between 0.01 and about 20 weight percent, based on titanium dioxide, of a solid inorganic water-soluble metal salt selected from the group consisting of halides, sulfates, bisulfates, nitrates, carbonates, bicarbonates, chlorates, phosphates, and silicates of metals selected from the group consisting of alkali metals, alkaline earth metals, aluminum and zirconium into said conduit.

15. In a process of preparing pigmentary titanium dioxide by vapor phase reaction of titanium tetrahalide with oxygenating gas at elevated temperatures wherein a gaseous suspension of titanium dioxide is cooled in an externally cooled conduit, and wherein said titanium dioxide deposits on and adheres to the internal surface of said conduit thereby hindering the passage of further of said gaseous suspension, the improvement which comprises introducing an effective amount of a solid, inorganic water-soluble metal salt selected from the group consisting of halides, sulfates, bisulfates, nitrates, carbonates, bicarbonates, chlorates, phosphates, and silicates of metals selected from the group consisting of alkali metals, alkaline earth metals, aluminum and zirconium into said conduit, thereby improving the passage of said gaseous suspension through said conduit.

16. In a process of preparing pigmentary titanium dioxide by vapor phase reaction of titanium tetrahalide with oxygenating gas at elevated temperatures wherein a gaseous suspension of titanium dioxide is cooled in an externally cooled conduit, and wherein said titanium dioxide deposits on and adheres to the internal surface of said conduit thereby hindering the removal of heat from said gaseous suspension, the improvement which comprises introducing an effective amount of solid, inorganic water-soluble metal salt selected from the group consisting of halides, sulfates, bisulfates, nitrates, carbonates, bicarbonates, chlorates, phosphates, and silicates of metals selected from the group consisting of alkali metals, alkaline earth metals, aluminum and zirconium into said conduit, thereby improving the removal of heat from said gaseous suspension.

17. In a process of preparing pigmentary titanium dioxide by vapor phase reaction of titanium tetrahalide with oxygenating gas at elevated temperatures in a reactor wherein a reactor product stream comprising a gaseous suspension of titanium dioxide is passed through an externally cooled conduit, and wherein said titanium dioxide deposits on and adheres to the internal surface of said conduit, the improvement which comprises introducing between 0.01 and about 20 weight percent, based on titanium dioxide, of a solid, inorganic water-soluble metal salt to said reactor product stream prior to or during its passage through said conduit.

18. A process according to claim 17 wherein, in addition, said solid, inorganic water-soluble metal salt is substantially removed from the titanium dioxide product by aqueously treating said titanium dioxide product subsequent to its passage through said conduit.

19. In a process of cooling gaseous suspensions of finely-divided metal oxide by passage through an externally cooled conduit wherein said metal oxide deposits on and adheres to the internal surface of said conduit, the improvement which comprises lowering the temperature of the gaseous suspension at the outlet of said conduit by introducing to said conduit between 0.01 and about 20 weight percent of a solid, inorganic water-soluble metal salt.

20. In a process of cooling gaseous suspensions of particulate solids by passage through an externally cooled conduit wherein said particulate solid deposits on and adheres to the internal surface of said conduit, the improvement which comprises decreasing the differential pressure between the inlet and outlet of the conduit by introducing to said conduit an effective amount of a solid, inorganic water-soluble metal salt.

21. A process according to claim 20 wherein said particulate solid is finely-divided metal oxide and wherein between about 0.01 and about 20 weight percent of solid, inorganic, water-soluble metal salt selected from the group consisting of halides, sulfates, bisulfates, nitrates, carbonates, bicarbonates, chlorates, phosphates and silicates of metals selected from the group consisting of alkali metals, alkaline earth metals, aluminum and zirconium is introduced to said conduit.

22. A process according to claim 21 wherein said particulate solid is pigmentary titanium dioxide.

23. In a process of cooling gaseous suspensions of finely-divided metal oxide by passage through externally cooled conduits wherein said metal oxide deposits on and adheres to the internal surface of said conduit, the improvement which comprises limiting the thickness of said deposit by introducing between about 0.01 and about 20 weight percent of solid, inorganic water-soluble metal salt selected from the group consisting of halides, sulfates, bisulfates, nitrates, carbonates, bicarbonates, chlorates, phosphates and silicates of metals selected from the group consisting of alkali metals, alkaline earth metals, aluminum and zirconium to said conduit.

24. In a process of cooling gaseous suspensions of pigmentary titanium dioxide by passage through an externally cooled conduit wherein said pigmentary titanium dioxide deposits on and adheres to the internal surface of said conduit, the improvement which comprises decreasing the differential pressure between the inlet and outlet of the conduit by introducing to said conduit from 0.01 to 20 weight percent, based on the amount of pigmentary titanium dioxide being cooled, of a member selected from the group consisting of potassium chloride and sodium carbonate.

25. In a process of cooling gaseous suspensions of pigmentary titanium dioxide by passage through an externally cooled conduit wherein said pigmentary titanium dioxide deposits on and adheres to the internal surface of said conduit, the improvement which comprises introducing from 0.01 to 20 weight percent of a member selected from the group consisting of potassium chloride and sodium carbonate to said conduit.

References Cited

UNITED STATES PATENTS

| | | | |
|---|---|---|---|
| 2,537,045 | 1/1951 | Garbo | 165—95 |
| 3,258,064 | 6/1966 | Gniewek et al. | 165—1 |

FOREIGN PATENTS 553,529    2/1958    Canada.

ROBERT A. O'LEARY, Primary Examiner

CHARLES SUKALO, Assistant Examiner

U.S. Cl. X.R.

165—95, 134